United States Patent [19]

Nebelung et al.

[11] Patent Number: 4,978,380
[45] Date of Patent: Dec. 18, 1990

[54] MOULD MECHANISMS

[75] Inventors: Hermann H. Nebelung, Winsen/Luhe, Fed. Rep. of Germany; Johann Zsifkovits, Forch, Switzerland

[73] Assignee: Emhart Industries, Inc., Towson, Md.

[21] Appl. No.: 441,686

[22] Filed: Nov. 27, 1989

[30] Foreign Application Priority Data

Dec. 15, 1988 [GB] United Kingdom ............... 8829252

[51] Int. Cl.⁵ .............................................. C03B 9/44
[52] U.S. Cl. ........................................ 65/260; 65/357; 249/167
[58] Field of Search ............... 249/161, 162, 167, 173; 65/313, 357, 260

[56] References Cited

U.S. PATENT DOCUMENTS

| 4,004,905 | 1/1977 | Mumford | 65/357 X |
| 4,543,118 | 9/1985 | Nebelung | 65/360 |
| 4,770,687 | 9/1988 | Nebelung | 65/360 |

Primary Examiner—Robert L. Lindsay
Attorney, Agent, or Firm—Spencer T. Smith

[57] ABSTRACT

A mould mechanism for a glass forming machine comprises two mould supports which have first end portions which are mounted on parallel shafts for linear movement between mould open and mould closed positions. The mould supports are moved by mould operating mechanisms which each comprise a hydraulically operated piston and cylinder device providing one of the shafts. A clamping mechanism is provided to latch the mould supports together when in mould closed position.

4 Claims, 3 Drawing Sheets

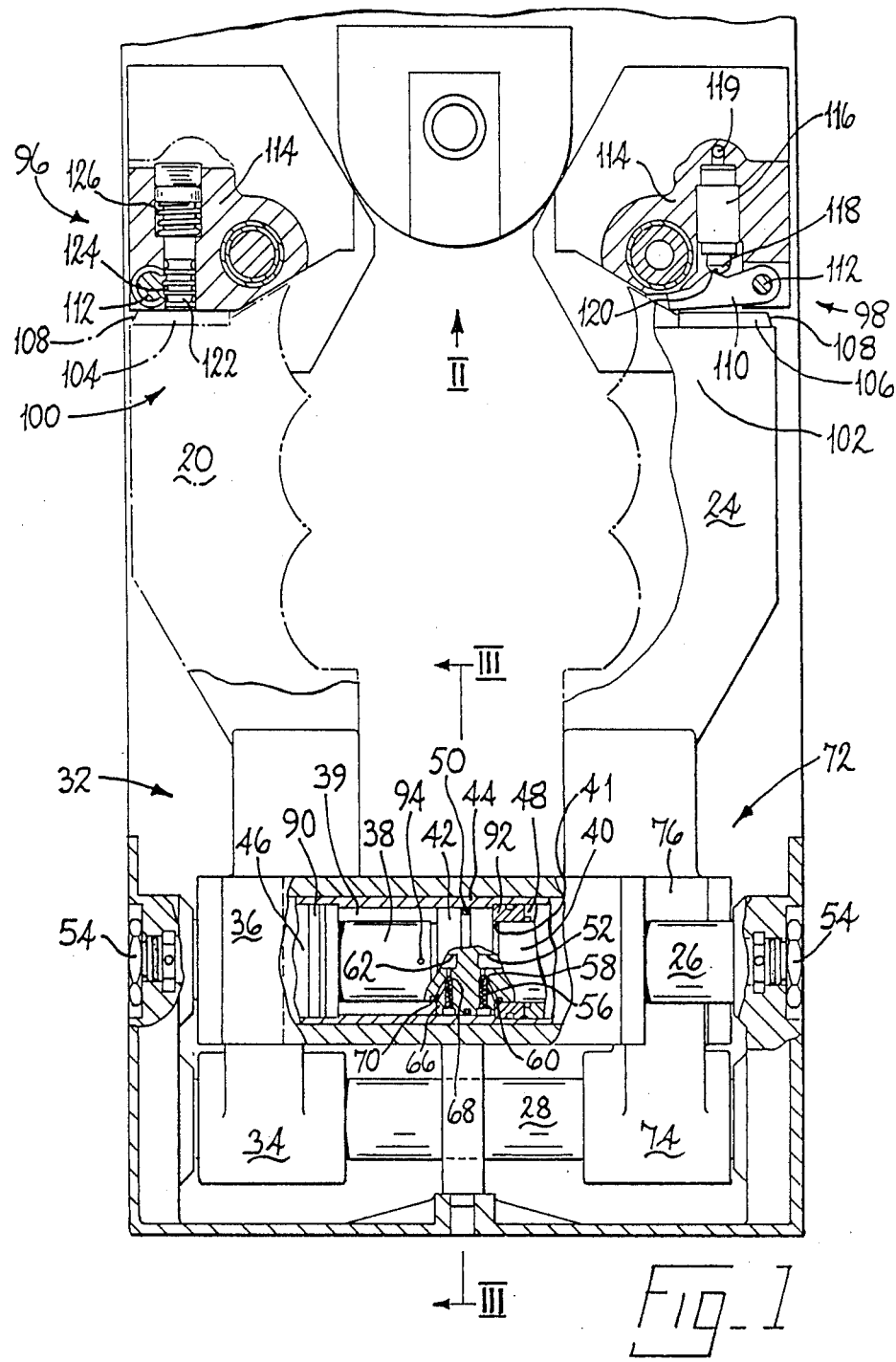
Fig_1

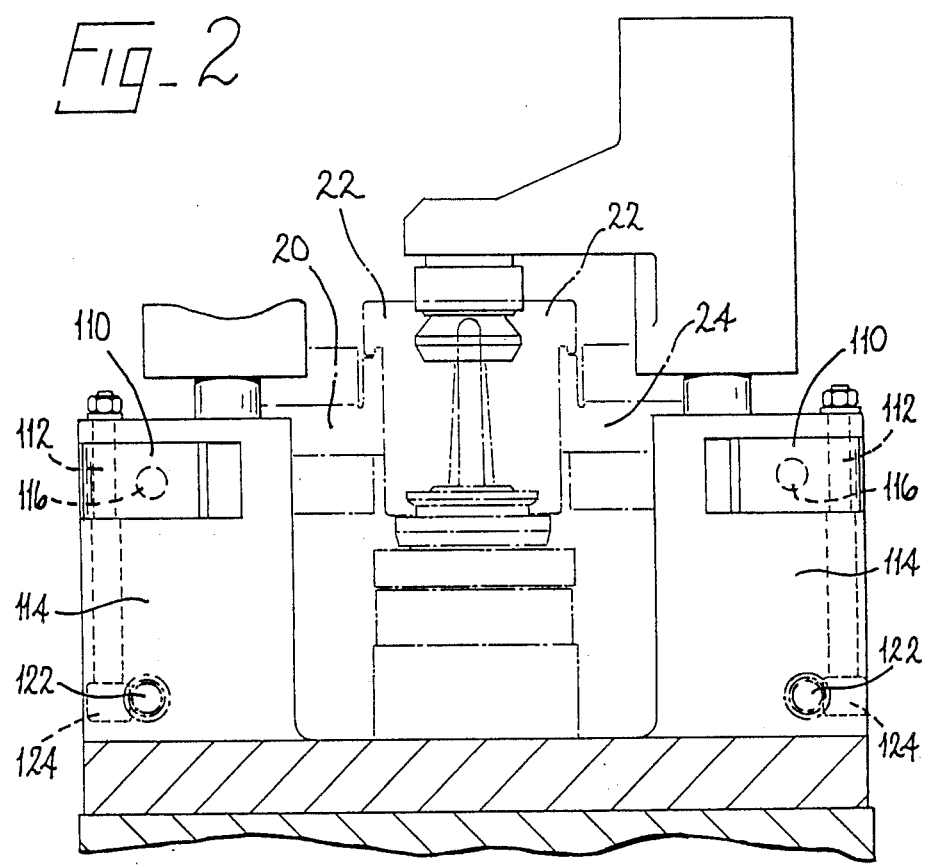
Fig_2
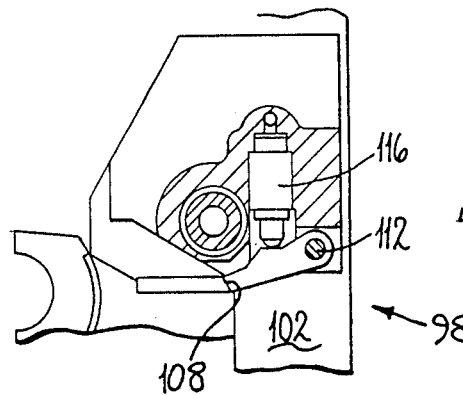
Fig_4

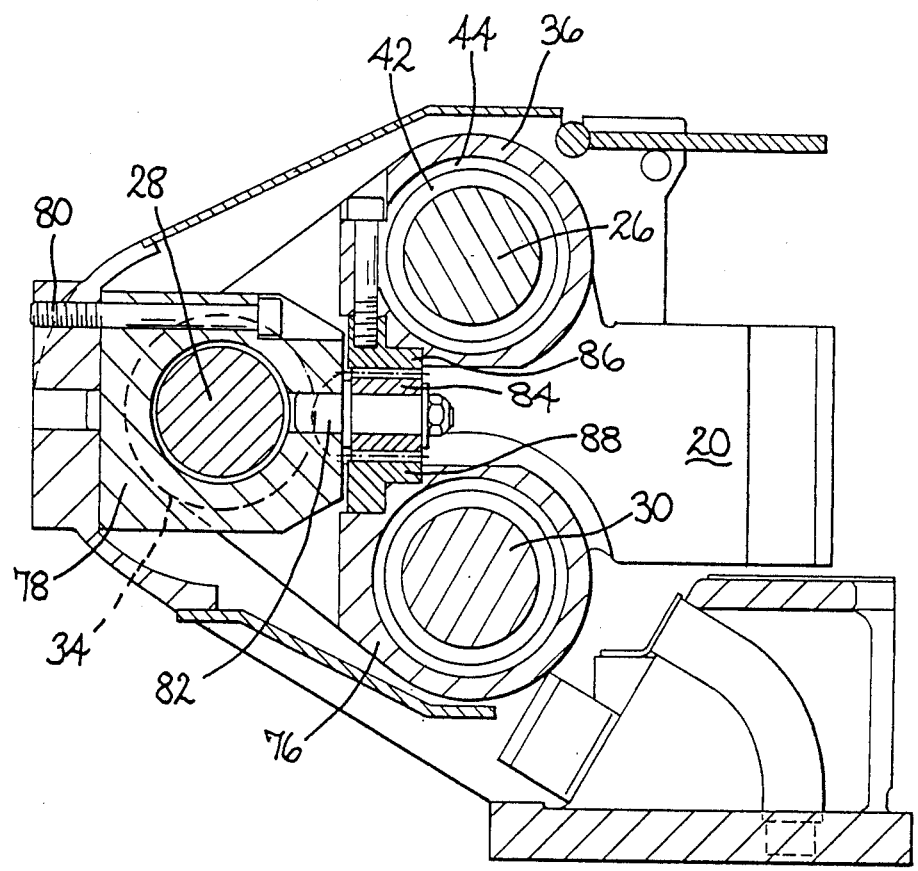
Fig_3

MOULD MECHANISMS

BACKGROUND OF THE INVENTION

This invention is concerned with mould mechanisms for glassware forming machines.

Mould mechanisms for glassware forming machines normally comprise a first mould support arranged to support one or more mould portions, a second mould support arranged to support the same number of mould portions and mould operating mechanism arranged to move the mould supports between a mould closed position, in which the mould portions on one support engage the mould portions on the other support to define mould cavities into which molten glass can be moulded, and a mould open position in which the mould portions are separated to allow moulded glass to be removed from the cavities.

Such mould mechanisms are commonly used in glassware forming machines of the I.S. type, that is to say a machine which comprises a plurality of sections each of which operates to mould gobs of molten glass into glass containers. The sections are arranged to receive gobs from a common source and operate cyclically with phase differences between the various sections. Each section comprises a blank station at which gobs are moulded to an intermediate shape or parison, and a finish station at which parisons are moulded into complete containers. A section has a mould mechanism as described above at its blank station to provide mould cavities in which the parisons are moulded, and at its finish station to provide mould cavities in which the complete containers are moulded.

In many I.S. machines the mould mechanism comprises mould supports which are provided by arms pivotally mounted on a common vertical pivot, but in others, generally known as the A.I.S. type of machine, the mould mechanism comprises mould supports which are linearly movable towards and away from each other. The mould supports may each support mould portions which cooperate to provide one, two, three or four mould cavities.

In the moulding operations considerable forces are applied to the molten glass to form it into the required shape, and these forces tend to force the mould portions away from each other, thus to separate the mould portions slightly and to cause the formation of seams on the moulded glass. Further at certain stages in the moulding operation downward forces are applied to the mould portions, which may cause deflection of the mould portions and again result in opposed mould portions not being in perfect correspondence or contact, again to result in the formation of faults on the moulded glass.

Various solutions have been suggested to avoid distorting movement of the mould portions. In UK Patent Specification No. 2194784 is described a mould mechanism for a glassware forming machine comprising transversely extending shafts, first and second opposed mould supports each having first end portions mounted on said shafts for linear movement between mould closed and mould open positions, mould operating mechanism arranged to move the mould supports between mould closed and mould open positions and acting on said first end portion and first and second clamping devices arranged to hold the first and second mould supports in their mould closed positions. However, this mould mechanism is not completely successful in solving the problem. Firstly, the mould operating mechanism comprises a pneumatic cylinder linked to the mould supports by a system of pivoted levers. The mould closing force has to be transmitted to the mould supports through a shaft, and there is a possibility of torsional deflection of this shaft, thus effectively to reduce the force with which the mould members are held closed. Further a system of links is inherently subject to cross forces which cause distortion and result in wear, particularly of the transversely extending shafts and of the portions of the mould supports sliding on them. Such wear can give rise to small undesirable deflections of the mould supports. Further still, there is a tendency to wish to use increasing numbers of mould cavities in any one section of the glassware moulding machine—whereas at one time one or two cavities per section were usual, today three or even four are common. The increase in the number of cavities increases the possibility of deflection of the mould support members. While the mechanism described in UK No. 2194784 comprises clamping devices to hold the mould supports in their mould closed positions, these operate on central portions of the mould and are themselves necessarily capable of distortion unless made excessively robust.

It is one of the objects of the present invention to provide a mould mechanism for a glass forming machine in which distortion or movement of the mould supports when in their mould closed position is minimized.

BRIEF SUMMARY OF THE INVENTION

The present invention provides a mould mechanism for a glassware forming machine comprising, transversely extending shafts, first and second opposed mould supports each having first end portions mounted on said shafts for linear movement between mould closed and mould open positions, mould operating mechanism acting on said first end portions, and arranged to move the mould supports between their mould closed and mould open positions wherein a first one of the transversely extending shafts is common to the two mould supports and a second and third of said shafts provide a hydraulic piston and cylinder arrangement for the first and second mould supports respectively.

Preferably in a mould mechanism according to the invention the two mould supports each comprise a rack, the two racks being engaged with opposite sides of a pinion whereby corresponding opposed movements of the mould supports is ensured.

Preferably also a mould mechanism according to the invention comprises a clamping mechanism arranged to hold the first and second mould supports in their mould closed position and having a latching device for each mould support which operates on opposed second end portions of the mould supports.

BRIEF DESCRIPTION OF THE DRAWINGS

There now follows a detailed description, to be read with reference to the accompanying drawings, of a mould mechanism which has been selected to illustrate the invention by way of example.

In the accompanying drawings;

FIG. 1 shows a view, partly in plan and partly in section, of a blank mould mechanism with mould supports in a mould open position;

FIG. 2 shows a view, with some parts omitted, in the direction II—II of FIG. 1;

FIG. 3 shows a view in section taken along the line III—III of FIG. 1;

FIG. 4 shows a partial view of parts shown in FIG. 1 in a mould closed position.

DETAILED DESCRIPTION OF A PREFERRED EMBODIMENT OF THE INVENTION

The illustrative mould mechanism is particularly designed for used in an individual section glassware forming machine of the type known as the A.I.S. machine described generally in GB Patent Specification No. 1529237.

The mould mechanism comprises a first mould support 20 arranged to support three side mould portions 22, and a second opposed mould support 24 also arranged to support three side mould portions 22. The mould supports 20 and 24 are mounted on transversely extending shafts 26, 28, 30 the shafts 26 and 30 providing hydraulic piston and cylinder motors and the shaft 30 being common to the two mould supports as will be described in more detail later, for linear movement between mould open positions as shown in FIG. 1 and mould closed positions as indicated in FIG. 2.

In the closed positions each side mould portion 22 supported on one mould support engages a cooperating side mould portion 22 supported on the other mould support to define a mould cavity with an upwardly facing opening through which gobs of glass may be received into the cavity. In the mould open position the side moulds are separated one from the other so that moulded glass can be removed from the mould cavity.

The mould support 20 has a first end portion 32 which is mounted on the shafts 26 and 28. The support 20 comprise a sleeve 34 which is slidably mounted on the shaft 28 and a second, larger, transverse sleeve 36 which is slidably mounted on the shaft 26. The shaft 26, which is fixed in the frame of the machine, comprises two reduced portions 38, 40 connected by an enlarged portion 42. The sleeve 36 is provided with an inner cylindrical sleeve 44 which is secured in the sleeve 36 by end caps 46, 48, each provided with ring seals to seal the caps 46, 48 around the outside of the portions 38, 40 of the shaft 26 and around the inside of the sleeve 44. A further ring seal 50 acts between the enlarged portion 42 of the shaft 26 and the inside of the sleeve 44. Two chambers 39 and 41 are thus provided around the reduced portions 38, 40, with end faces defined by the enlarged portion 42 and the end caps 46, 48 respectively.

The illustrative mould mechanism comprises mould operating mechanism arranged to move the mould supports between their mould closed and mould open positions. The mould operating mechanism for the mould support 20 will now be described.

The shaft 26 is provided with a central bore 52 which is connected to a source of hydraulic fluid at 54. The bore 52 extends through the reduced portion 40 of the shaft 26 and part way into the enlarged portion 42. A transverse bore 56 extends outwardly to the outer surface of the portion 42 and contains a check valve 58 which can control passage of fluid between the bore 54 and an inclined passage 60 leading to the outer surface of the reduced portion 40 into the chamber 41. It can be seen from FIG. 1 that when hydraulic fluid is admitted through the bore 52 it will pass into the bore 56, past the check valve 58, through the inclined passage 60 into the chamber 41 and between the end cap 48 and the enlarged portion 42. The portion 42 then acts as a stationary piston and the end cap 48, and thus the sleeve 36 and the mould support 20 is forced to the right (viewing FIG. 1) into a mould closed position.

The shaft 26 is provided, on the opposite side of the enlarged portion 42, correspondingly with a central bore 62, transverse bore 66, check valve 68 and inclined passage 70, and hydraulic fluid admitted at 64 into the bore 62 will pass into the chamber 39 and act between the enlarged portion 42 and the end cap 48 to move the mould support 20 from its mould closed position back into the mould open position as shown in FIG. 1. While hydraulic fluid is supplied to the chamber 41 to move the sleeve 36 to the right (FIG. 1) the chamber 39 is connected to sink so that hydraulic fluid may flow out through the connection 54.

The mould operating mechanism for the mould support 24 is generally similar to that for the support 20 and is not shown in detail. The mould support 24 has a first end portion 72 which is mounted on the shafts 28 and 30. The support 24 comprises a sleeve 74 which is slidably mounted on the shaft 28 and a second larger, transverse sleeve 76 which is slidably mounted on the shaft 30. The shaft 30 is fixed on the frame of the machine and is similar to the shaft 26—thus the supply of hydraulic fluid to corresponding passages in the shaft 30 causes the support 24 to move between its mould open and its mould closed positions in a manner identical to movement of the support 22.

The mould operating mechanism also comprises cushioning means to cushion movement of the mould supports 20 and 24 as they move to the extremes of their mould open and mould closed positions. On the reduced portions 38 and 40 of the shaft 26 are mounted two cushioning rings 90, 92. Holes 94 lead from the surface of the reduced portion to the bores 52 and 62, and when the sleeve 36 is in its mould open position (as in FIG. 1) the cushioning ring 90 covers the holes 94 in the reduced portion 40 while the holes 94 in the reduced portion 38 are open. On movement of the sleeve to the right, on movement to a mould closed position, hydraulic fluid may flow freely from the chamber 39 both through the holes 94 and through the inclined passage 70. When movement to the right has proceeded so that the ring 90 on the portion 38 covers the holes 94, flow of hydraulic fluid out from the chamber 39 can only take place through the inclined passage 70 and is restricted by the check valve 68, thus to slow up movement of the sleeve 36 as it approaches mould closed position. A similar cushioning action is effected by the sleeve 92 on the supply of hydraulic fluid into the chamber 41 on mould closing movement, and it will be understood that similar cushioning means operate on the sleeve 74, and thus cushioning of both supports 20 and 24 as they move into their extreme positions is achieved.

It can thus be seen that the mould operating mechanism for each mould support comprises a piston and cylinder device acting directly on the first end portion 32, 72 of the supports 20, 24.

The illustrative mould mechanism also comprises means by which symmetrical movement of the two mould supports 20, 24 is ensured. A block 78 is secured to the frame of the mechanism by bolts 80 and surrounds the shaft 28. Mounted on the block 78 on a shaft 82 is a pinion 84. A rack 86 is secured to the sleeve 36 of the support 20 and a rack 88 is secured to the sleeve 76 of the support 24, and these racks engage opposite sides of the pinion 84. It will thus be seen that equal and opposite movement of the sleeves 36 and 76 is ensured.

The illustrative mechanism also comprises a clamping mechanism arranged to clamp the mould supports when in their mould closed position. The clamping mechanism comprises first and second latching devices 96, 98 arranged to latch the mould supports 20, 24 in their mould closed positions. The devices 96, 98 are arranged to operate on second end portions 100, 102 of the supports 20, 24 remote from the first end portions 32, 72 supported on the shafts 26, 28 and 30.

The latching devices 96 and 98 are identical in construction (save for being mirror images). The end portion 100, 102 of the supports 20, 24 comprise strengthening struts 104, 106 each comprising a vertical clamping surface 108 which is inclined to the plane of separation of the mould supports. Each latching device comprises a latch 110 secured to a shaft 112 pivotably mounted in a block 114—the block 114 of the device 96 is conveniently in a funnel cylinder head of the machine, the block 114 of the device 98 in a baffle cylinder head of the machine. A hydraulic piston and cylinder device 116 has a head 118 arranged to bear against a step 120 of the latch 110. Hydraulic fluid is supplied to the device 116 through a supply pipe 119. The shaft 112 comprises a toothed section 124 which engages a rack 122 mounted in the block 114 and urged by a spring 126 to rotate the shaft 112 into a latch withdrawn position.

When the mould supports are moved into their mould closed position hydraulic fluid is supplied through the passage 119 to the piston and cylinder device 116 to cause the head 118 to bear against the latch 110. When the support reaches its mould closed position the latch 110 is moved into engagement with the surface 108 thus into clamping engagement with the mould support, latching it in its closed position. Before mould opening takes place, but after glass in the moulds 22 has been formed, the latches are retracted—hydraulic fluid in the pipe 119 is connected to sink, and the spring 126 causes the rack 122 to rotate the shaft 112 to withdraw the latch 110, thus allowing the mould supports to move into their open positions.

It will be realised that in the illustrative mechanism, not only can increased mould closing forces be obtained but that the absence of the conventional links and shafts in the mould operating mechanism avoids many possible areas of wear and distortion. The mould supports are moved into and out of their mould closed positions by linear acting forces and the latching devices ensure that the mould supports are held in their mould closed position with a minimal risk of distortion.

We claim:

1. A mold mechanism for a glassware forming mounting comprising
    a first mold support including an integral mounting assembly having
        first cylindrical sleeve means adapted to be displaced relative to a stationary piston, and
        second cylindrical sleeve means parallel to said first cylindrical sleeve means,
    a second mold support including an integral mounting assembly having
        third cylindrical sleeve means adapted to be displaced relative to a stationary piston and
        fourth cylindrical sleeve means parallel to said third cylindrical sleeve means,
    a first shaft for supporting said first sleeve means,
    second shaft means for supporting said second and fourth sleeve means and
    a third shaft for supporting said third sleeve means, and
    stationary piston means for displacing said first and third sleeve means between mold open and mold closed positions.

2. A mold mechanism according to claim 1, wherein said second shaft means comprises a single shaft.

3. A mold mechanism according to claim 1, further comprising means for synchronizing the displacement of said first and second mold supports.

4. A mold mechanism according to claim 3, wherein said synchronizing means comprises rack means on said first and third sleeve means and pinion means interconnecting said rack means.

* * * * *